(12) United States Patent
Kim

(10) Patent No.: US 8,897,259 B2
(45) Date of Patent: Nov. 25, 2014

(54) METHOD AND APPARATUS FOR CHANGING SERVING BASE STATION IN MOBILE COMMUNICATION SYSTEM

(75) Inventor: Young-Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 12/952,714

(22) Filed: Nov. 23, 2010

(65) Prior Publication Data

US 2011/0122842 A1 May 26, 2011

(30) Foreign Application Priority Data

Nov. 26, 2009 (KR) .................. 10-2009-0115208

(51) Int. Cl.
*H04W 4/00* (2009.01)
*H04W 36/30* (2009.01)
*H04W 36/08* (2009.01)
*H04W 36/00* (2009.01)

(52) U.S. Cl.
CPC .............. *H04W 36/30* (2013.01); *H04W 36/08* (2013.01)
USPC ............................ 370/331; 455/436; 455/437

(58) Field of Classification Search
None
See application file for complete search history.

(56) References Cited

U.S. PATENT DOCUMENTS

| 2004/0196793 A1* | 10/2004 | Lucidarme et al. | 370/252 |
| 2006/0276191 A1* | 12/2006 | Hwang et al. | 455/436 |
| 2006/0281461 A1* | 12/2006 | Kwun et al. | 455/436 |
| 2009/0129334 A1* | 5/2009 | Ma et al. | 370/331 |
| 2009/0286563 A1* | 11/2009 | Ji et al. | 455/501 |

* cited by examiner

*Primary Examiner* — Ayaz Sheikh
*Assistant Examiner* — Sori Aga
(74) *Attorney, Agent, or Firm* — Jefferson IP Law, LLP

(57) ABSTRACT

A method of changing a serving Base Station (BS) in a mobile communication system, and a mobile communication system for implementing the method, are provided. The method includes setting a minimum UpLink (UL) quality value, receiving DownLink (DL) quality values for a current serving BS of a User Equipment (UE) and respective BSs included in an active set of the UE from the UE periodically based on a predefined first period, receiving UL quality values for the serving BS and the respective BSs included in the active set from the serving BS and the respective BSs included in the active set periodically based on a predefined second period, determining if the UL quality value for the serving BS is less than the minimum UL quality value, when, as a result of the determination, the UL quality value for the serving BS is less than the minimum UL quality value, selecting BSs, which have UL quality values equal to or greater than the minimum UL quality value among the BSs included in the active set, as candidate BSs, and determining a BS, which has a maximum DL quality value among the candidate BSs, as a new serving BS of the UE, wherein the active set represents a set of BSs that can provide DL/UL service to the UE.

8 Claims, 4 Drawing Sheets

METHOD AND APPARATUS FOR CHANGING SERVING BASE STATION IN MOBILE COMMUNICATION SYSTEM

PRIORITY

This application claims the benefit under 35 U.S.C. §119 (a) of a Korean patent application filed in the Korean Industrial Property Office on Nov. 26, 2009, and assigned Serial No. 10-2009-0115208, the entire disclosure of which is hereby incorporated by reference.

BACKGROUND OF THE INVENTION

1. Field of the Invention

The present invention relates to a method and apparatus for changing a serving base station in a mobile communication system.

2. Description of the Related Art

In order to maintain optimal performance when data is transmitted in a DownLink (DL) to a User Equipment (UE), a mobile communication system determines which Base Station (BS) can provide the highest quality DL among current serving BSs of the UE and BSs included in the active set of the UE, as the final serving BS of the UE. With regard to this, the active set represents a set of BSs that can provide DL/UpLink (UL) service to the UE.

In general, after the final serving BS is determined, the BS with the highest DL quality may be changed to a BS other than the serving BS due to environmental changes, such as movements. Accordingly, the UE periodically measures the DL quality value for each of its serving BS and the BSs included in the active set, and transmits the measured DL quality values to the serving BS, the neighbor BSs, and a Radio Network Controller (RNC). Based on the transmitted DL quality values, the RNC then determines to maintain or change the current serving BS such that the corresponding UE is served by a serving BS with the highest DL quality value.

In a mobile communication system, DL data service is provided by assigning shared resources to a plurality of users. The DL shared resources are assigned based on DL quality values that are measured and reported in the UpLink (UL) by each UE. That is, a UE reporting a relatively high DL quality value for its serving BS is assigned more resources, and a UE reporting a relatively low DL quality value for its serving BS is assigned fewer resources than the UE having a serving BS with a higher DL quality value. This is because, even if the UE having a serving BS with a relatively low DL quality value is assigned more resources, the possibility that the assigned resources are transferred to the UE is low.

However, there may be a situation where an RNC cannot receive DL quality values, which are measured and transmitted by a specific UE, when a UL quality value for the serving BS of the specific UE is not high. In such a case, since the RNC cannot exactly determine DL quality values for the specific UE, it assigns a small amount of resources to the specific UE regardless of a DL quality value for the serving BS of the specific UE. This causes a problem in that the specific UE cannot be provided with a data service having good quality.

SUMMARY OF THE INVENTION

An aspect of the present invention is to address at least the above-mentioned problems and/or disadvantages and to provide at least the advantages described below. Accordingly, an aspect of the present invention is to provide a method and apparatus for changing a serving BS in a mobile communication system.

Further, an aspect of the present invention is to provide a method and apparatus for selecting a serving Base Station (BS) in consideration of DownLink (DL) quality values and UpLink (UL) quality values for the serving BS of a User Equipment (UE) and BSs included in the active set of the UE.

Further, an aspect of the present invention is to provide a method and apparatus for selecting a BS, which has a maximum DL quality value among BSs having UL quality values equal to or greater than a predefined minimum UL quality value, as the serving BS of a UE.

In accordance with an aspect of the present invention, a method of changing a serving BS in a mobile communication system is provided. The method includes setting a minimum UL quality value, receiving DL quality values for a current serving BS of a UE and respective BSs included in an active set of the UE from the UE periodically based on a first period that is predefined for the UE, receiving UL quality values for the serving BS and the respective BSs included in the active set from the serving BS and the respective BSs included in the active set periodically based on a second period that is predefined for the UE, determining if the UL quality value for the serving BS is less than the minimum UL quality value, when, as a result of the determination, the UL quality value for the serving BS is less than the minimum UL quality value, selecting BSs, which have UL quality values equal to or greater than the minimum UL quality value among the BSs included in the active set, as candidate BSs, and determining a BS, which has a maximum DL quality value among the candidate BSs, to be a new serving BS of the UE, wherein the active set represents a set of BSs that can provide DL/UL service to the UE.

In accordance with another aspect of the present invention, a mobile communication system is provided. The system includes, a UE, a serving BS for serving the UE, and a BS controller for setting a minimum UL quality value, for receiving DL quality values for a current serving BS of the UE and respective BSs included in an active set of the UE from the UE periodically based on a first period that is predefined for the UE, for receiving UL quality values for the serving BS and the respective BSs included in the active set from the serving BS and the respective BSs included in the active set periodically based on a second period that is predefined for the UE, for determining if the UL quality value for the serving BS is less than the minimum UL quality value, for selecting BSs, which have UL quality values equal to or greater than the minimum UL quality value among the BSs included in the active set, as candidate BSs when, as a result of the determining, the UL quality value for the serving BS is less than the minimum UL quality value, and for determining a BS, which has a maximum DL quality value among the candidate BSs, to be a new serving BS of the UE, wherein the active set represents a set of BSs that can provide DL/UL service to the UE.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method and apparatus for changing a serving Base Station (BS) in a mobile communication system according to exemplary embodiments of the present invention are described below. In the exemplary embodiments of the present invention, it is assumed, by way of example, that the mobile communication system is Wideband Code Division Multiple Access (WCDMA) system. However, the method and apparatus for changing a serving BS of the present invention may be used in other mobile communication systems.

Figure 1:
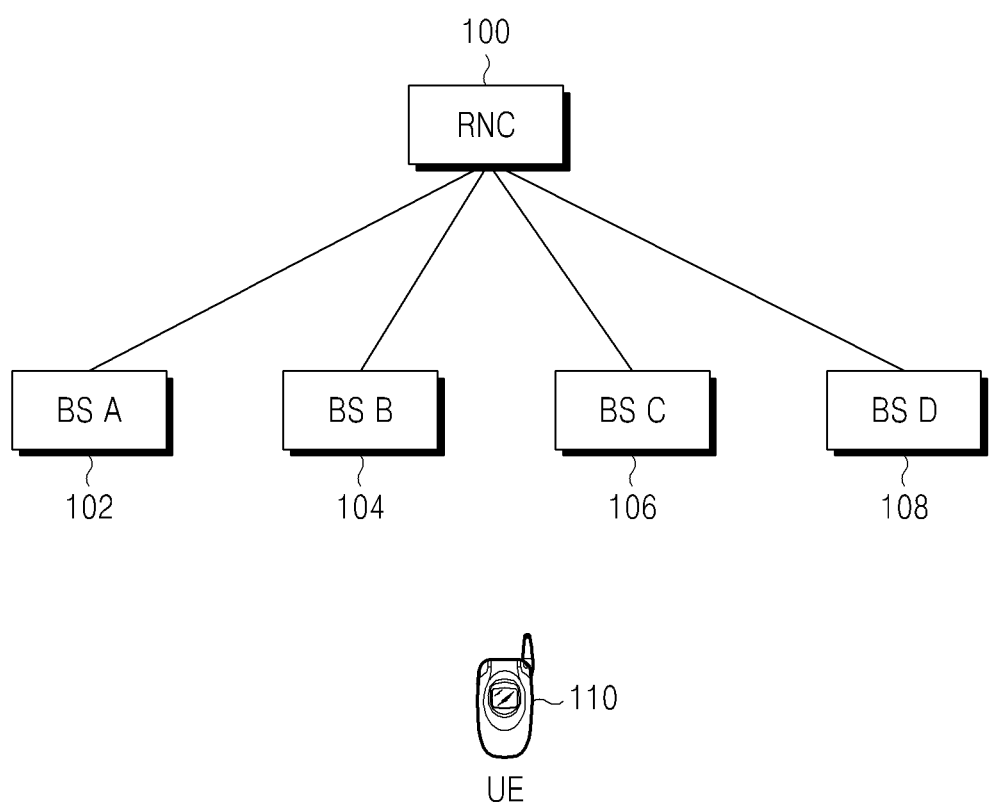
FIG. 1 is a view illustrating an architecture of a mobile communication system in accordance with an exemplary embodiment of the present invention.

FIG. 1 illustrates the architecture of a mobile communication system according to an exemplary embodiment of the present invention.

Referring to FIG. 1, the mobile communication system includes a Radio Network Controller (RNC) 100, BSs A, B, C, and D 102 to 108, and a User Equipment (UE) 110.

The RNC 100 controls BSs A, B, C, and D 102 to 108, and simultaneously controls the UE 110 by transmitting control messages to the UE 110 through BSs A, B, C, and D 102 to 108. The UE 110 measures DownLink (DL) quality values for respective BSs A, B, C, and D 102 to 108, and reports the measured DL quality values to BSs A, B, C, and D 102 to 108. BSs A, B, C, and D 102 to 108 are included in an active set, that is, a set of neighbor BSs that can provide DL/UpLink (UL) service to the UE 110.

BSs A, B, C, and D 102 to 108 transmit the DL quality values, which are received from the UE 110, to the RNC 100 under instruction of the RNC 100. Although not shown, BSs A, B, C, and D 102 to 108 may receive measured DL quality values from relays connected thereto, and transmit the received DL quality values to the RNC 100.

More specially, it is assumed, by way of example, that a minimum UL quality value, at or above which the DL quality values measured by the UE 110 can be received when they are transmitted in the UL, that is, transmitted to BSs A, B, C, and D 102 to 108 or the RNC 100, corresponds to "50", and the current serving cell is BS A 102. The minimum UL quality value is determined by an actual test according to the environment of a corresponding mobile communication system.

Here, examples of the DL and UL quality values between the UE 110 and each of BSs A, B, C, and D 102 to 108 are given as shown below in Table 1. The UL quality value includes a UL transfer rate, UL transmit power, etc.

TABLE 1

| BS | DL | UL | serving cell |
|----|----|----|----|
| A | 70 | 55 | O |
| B | 70 | 65 | X |
| C | 65 | 60 | X |
| D | 60 | 45 | X |

According to the measurement result in Table 1, the current serving BS, that is, BS A 102, has a UL quality value greater than the minimum UL quality value of "50", and thus it remains the current serving BS.

Subsequently, the UE 110 periodically transmits DL and UL quality values for each of BSs A, B, C, and D 102 to 108, measured according to a predefined criteria, to the RNC 100 through BSs A, B, C, and D 102 to 108. The RNC 100 then periodically monitors the transmitted DL and UL quality values.

The measurement result in Table 1 may be changed due to a movement of the UE 110, a radio environment change, or the like. Examples of so-changed measurement results are shown below in Table 2.

TABLE 2

| BS | DL | UL | serving cell |
|----|----|----|----|
| A | 70 | 45 | O |
| B | 70 | 65 | X |
| C | 65 | 60 | X |
| D | 60 | 45 | X |

Referring to Table 2, the current serving BS, that is, BS A 102, has the highest DL quality value among DL quality values for BSs A, B, C, and D 102 to 108. Thereupon, when the criteria for changing a serving BS according to the related art are employed, BS A 102 is continuously maintained as the serving BS. However, the current UL quality value of "45" for BS A 102 is less than the minimum UL quality value. That is, the current UL quality value for BS A 102 indicates that BS A 102 is in a state of being unable to sufficiently receive DL quality values transmitted by the UE 110.

Accordingly, in an exemplary embodiment of the present invention, changing to a final serving BS is performed in consideration of UL quality values, as well as DL quality values for neighbor BSs, measured by a corresponding UE. More specially, the RNC 100 periodically monitors UL and DL quality values pertinent to the UE 110, received through BSs A, B, C, and D 102 to 108. When the RNC 100 recognizes, as a result of such monitoring, that the UL quality value for the current serving BS, that is, BS A 102, is less than the minimum UL quality value at or above which data can be sufficiently received, it changes the current BS to any other BS satisfying the above condition.

More specifically, in an exemplary embodiment of the present invention, whether or not measured UL quality values for neighbor BSs are equal to or greater than the minimum UL quality value at or above which data can be sufficiently received is determined in order to change a serving BS. As a result of the determination, neighbor BSs with UL quality values equal to or greater than the minimum UL quality value are selected as a candidate group of serving BSs. Next, among the neighbor BSs belonging to the candidate group, a neighbor BS with the highest UL quality value is identified, and a cell where the identified neighbor BS is located is determined to be the serving cell of a corresponding UE. For example, in order to change the current serving cell, the RNC 100 selects BSs with UL quality values equal to or greater than the minimum UL quality value, that is, BS B 104 and BS C 106, as a candidate group of serving BSs, from among the BSs 104 to 108 excluding BS A 102.

Next, the RNC 100 determines BS B 104, which has the highest DL quality value within the candidate group, to be the new serving BS, and changes the current serving BS, that is, BS A 102 to the new serving BS, that is, BS B 104.

An example of the result of changing the current serving BS of the UE 110 to BS B 104, which has a UL quality value equal to or greater than the minimum UL quality value and simultaneously has the maximum DL quality value, is shown below in Table 3.

TABLE 3

| BS | DL | UL | serving cell |
|----|----|----|--------------|
| A  | 70 | 45 | X            |
| B  | 70 | 65 | O            |
| C  | 65 | 60 | X            |
| D  | 60 | 45 | X            |

Figure 2:
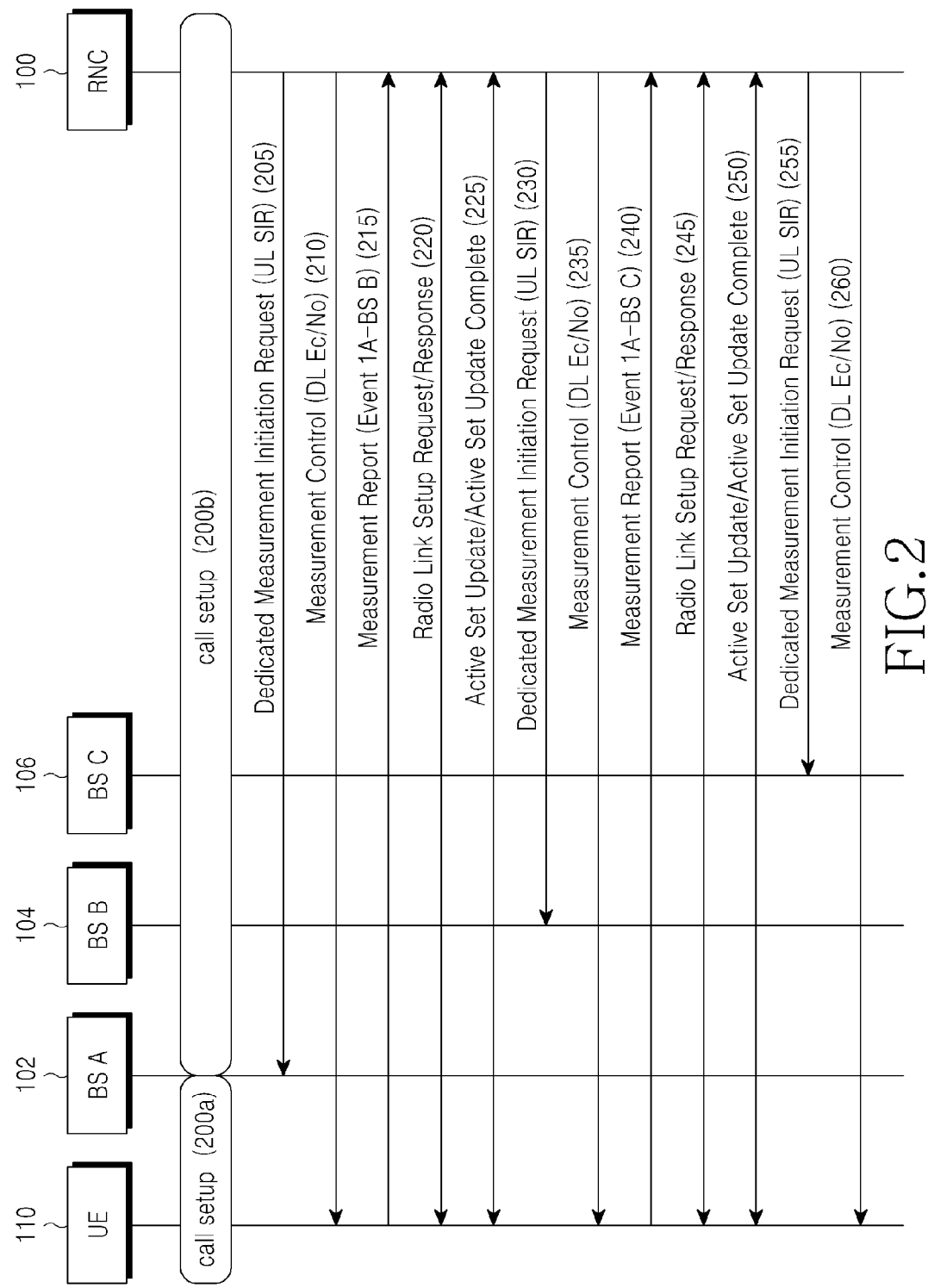
FIG. 2 is a flowchart illustrating an overall operation of changing a serving Base Station (BS) in a mobile communication system in accordance with an exemplary embodiment of the present invention.

FIG. 2 illustrates the overall operation of changing a serving BS in a mobile communication system according to an exemplary embodiment of the present invention. Here, it is assumed that BS A 102 is the current serving BS.

Referring to FIG. 2, in steps 200a and 200b, the UE 110 initiates a call setup to the RNC 100 through BS A 102. Once the call setup is complete, in step 205, the RNC 100 transmits a Dedicated Measurement Initiation Request (DMIR) message, which instructs BS A 102 to measure its UL quality value, to BS A 102. The DMIR message includes a dedicated measurement type and report characteristics. As an example, it is assumed that the dedicated measurement type is set to "Signal-to-Interference Ratio (SIR)", and the report characteristics are set to "periodic scheme with a reporting interval of 1 sec". In other words, the RNC 100 transmits the DMIR message to BS A 102, thereby instructing BS A 102 to measure and report its UL SIR every 1 second.

At the same time as step 205, in step 210, the RNC transmits a Measurement Control (MC) message, which instructs the UE 110 to measure each DL quality value, to the UE 110. The MC message includes an infra-frequency measurement quantity, reporting criteria, and a reporting interval. As an example, it is assumed that the infra-frequency measurement quantity is defined by "common pilot energy of carrier/interference of others (CPICH Ec/No)", the reporting criteria are set to "periodic scheme", and the reporting interval is set to "1 sec". In other words, the RNC 100 transmits the MC message to the UE 110, thereby instructing the UE 110 to measure and report each DL CPICH Ec/No every 1 second.

Next, in step 215, the UE 110 transmits a Measurement Report (MR) message, which informs the RNC 100 of its movement to BS B 104, and then proceeds to step 220. In step 220, the RNC 100 and the UE 110 complete a radio link setup to BS B 104 respectively by exchanging radio link setup request/response messages with each other. Then, in step 225, the RNC 100 and the UE 110 exchange active set update/active set update complete messages with each other, thereby adding BS B 104 to the active set of the UE 110. The active set represents a set of neighbor BSs that can provide DL/UL service to the UE 110.

In step 230, the RNC 100 transmits a DMIR message, which instructs BS B 104 to measure its UL quality value, to BS B 104. The DMIR message includes a dedicated measurement type and report characteristics. As an example, it is assumed that the dedicated measurement type is set to "SIR", and the report characteristics are set to "periodic scheme with a reporting interval of 1 sec". In other words, the RNC 100 transmits the DMIR message to BS B 104, thereby instructing BS B 104 to measure and report its UL quality value every 1 second.

At the same time as step 230, in step 235, the RNC 100 transmits an MC message, which instructs the UE 110 to measure each DL quality value, to the UE 110. The MC message includes an infra-frequency measurement quantity, reporting criteria, and a reporting interval. As an example, it is assumed that the infra-frequency measurement quantity is defined by "CPICH Ec/No", the reporting criteria are set to "periodic scheme", and the reporting interval is set to "1 sec". In other words, the RNC 100 transmits the MC message to the UE 110, thereby instructing the UE 110 to measure and report each DL CPICH Ec/No every 1 second.

Next, in step 240, the UE 110 transmits an MR message, which informs the RNC 100 of its movement to BS C 106, and then proceeds to step 245. In step 245, the RNC 100 and the UE 110 complete a radio link setup to BS C 106 respectively by exchanging radio link setup request/response messages with each other. Then, in step 250, the RNC 100 and the UE 110 exchange active set update/active set update complete messages with each other, thereby adding BS C 104 to the active set of the UE 110.

In step 255, the RNC 100 transmits a DMIR message, which instructs BS C 106 to measure its UL quality value, to BS C 106. The DMIR message includes a dedicated measurement type and report characteristics. As an example, it is assumed that the dedicated measurement type is set to "SIR", and the report characteristics are set to "periodic scheme with a reporting interval of 1 sec". In other words, the RNC 100 transmits the DMIR message to BS C 106, thereby instructing BS C 106 to measure and report its UL quality value every 1 second.

At the same time as step 255, in step 260, the RNC 100 transmits an MC message, which instructs the UE 110 to measure each DL quality value, to the UE 110. The MC message includes an infra-frequency measurement quantity, reporting criteria, and a reporting interval. As an example, it is assumed that the infra-frequency measurement quantity is defined by "CPICH Ec/No", the reporting criteria are set to "periodic scheme", and the reporting interval is set to "1 sec". In other words, the RNC 100 transmits the MC message to the UE 110, thereby instructing the UE 110 to measure and report each DL CPICH Ec/No every 1 second. Herein, the above description has been given by exemplifying the case where the reporting interval of CPICH Ec/No of each DL for the UE 110 and the reporting interval of SIR of each UL for the UE 110 are set to the same value of 1 sec. Of course, these reporting intervals may be set to different values. However, since the RNC must simultaneously consider DL and UL quality values for the UE 110 in order to change the serving BS of the UE 110, the reporting interval of CPICH Ec/No of each DL for the UE 110 and the reporting interval of SIR of each UL for the UE 110 may be set to the same value.

Through steps 215, 220, 240, and 245, BS B 104 and BS C 106 are added to the active set of the UE 110, and thus the RNC acquires DL and UL quality values, which are reported at a predefined period, that is, every 1 second, from BS B 104 and BS C 106, as well as BS A 102.

Figure 3:
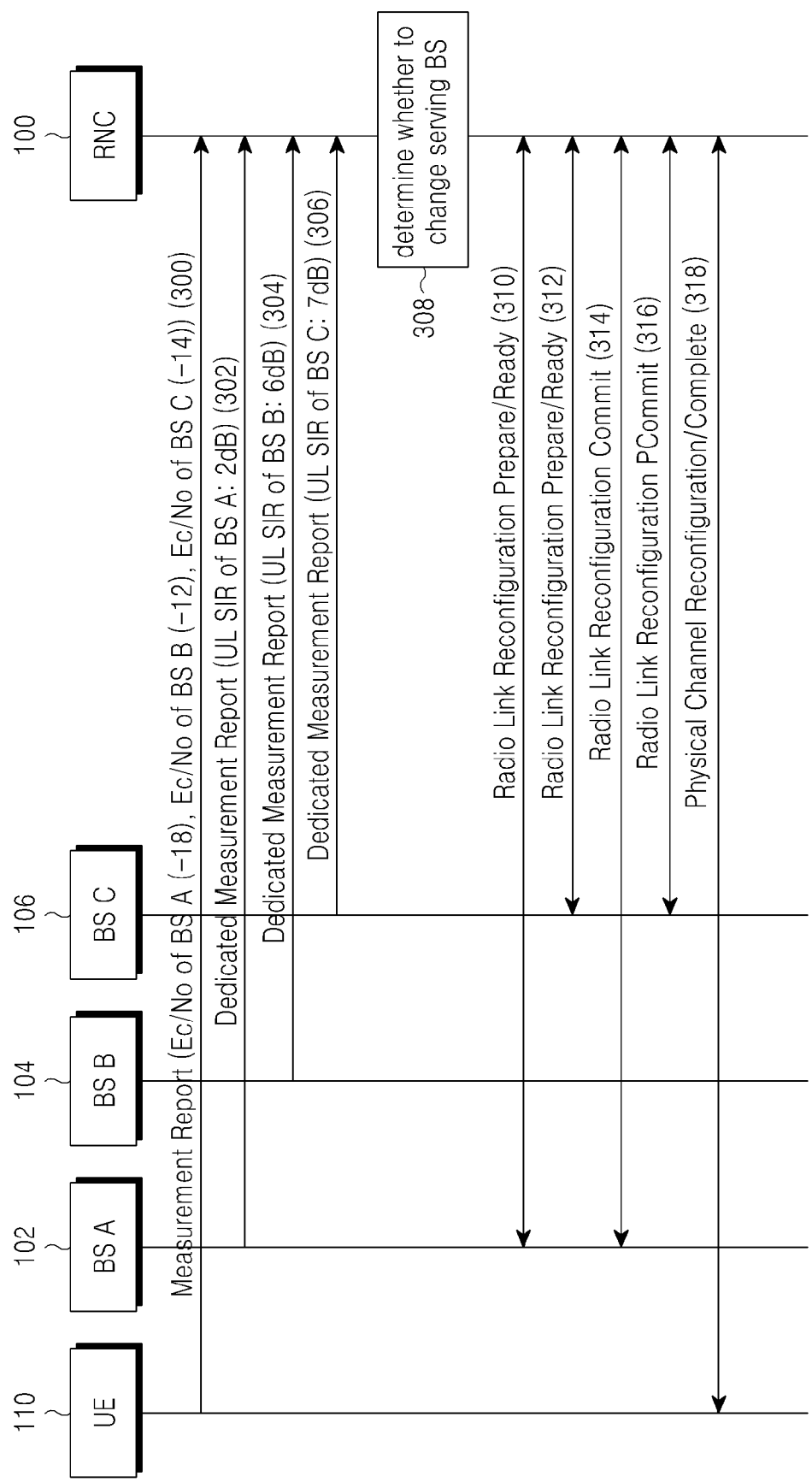
FIG. 3 is a flowchart illustrating a Radio Network Controller's (RNC's) operation of changing a serving BS, based on periodically received DownLink (DL) and UpLink (UL) quality values, in accordance with an exemplary embodiment of the present invention.

FIG. 3 illustrates an RNC's operation of changing a serving BS, based on periodically received DL and UL quality values, according to an exemplary embodiment of the present invention.

Referring to FIG. 3, in step 300, the UE 110 measures DL CPICH Ec/No for each of BS A 102, BS B 104, and BS C 106 included in its active set, and transmits an MR message including the measured DL CPICH Ec/No values to the RNC 100. As an example, it is assumed that the DL CPICH Ec/No value for BS A 102 corresponds to "−18", the DL CPICH Ec/No value for BS B 104 corresponds to "−12", and the DL CPICH Ec/No value for BS C 106 corresponds to "−14". The RNC 100 stores the DL CPICH Ec/No value for each of BS A 102, BS B 104, and BS C 106.

Next, in steps 302 to 306, BS A 102, BS B 104, and BS C 106 transmit Dedicated Measurement Report (DMR) messages to the RNC 100 respectively. Each of the DMR messages includes SIR measured every 1 sec according to the dedicated measurement type and report characteristics, which are set through the DMIR message received in step 205, 230, or 255 of FIG. 2. As an example, it is assumed that the UL SIR value for BS A 102, the UL SIR value for BS B 104, and the UL SIR value for BS 106 included in the respective DMR messages correspond to "2 dB", "6 dB", and "7 dB" respectively.

In step 308, the RNC determines whether to change the current serving cell, based on the latest received DL CPICH Ec/No values and UL SIR values for BS A 102, BS B 104, and BS C 106. More specially, it is assumed that the RNC 100 sets the minimum UL quality value of UL SIR to "5 dB". This quality reference value is determined through an actual test according to the environment of a corresponding mobile communication system.

Since the UL SIR value of "2 dB" for the current serving BS, that is, BS A 102, is less than the above quality reference value (5 dB), the RNC 100 selects BSs with UL SIR values equal to or greater than the minimum UL quality value as a candidate group, from among BS B 104 and BS C 106 included in the active set of the UE 110. Both BS B 102 and BS C 106 are selected as the candidate group because the UL SIR value of "6 dB" for BS B 104 and the UL SIR value of "7 dB" for BS C 106 are all greater than the minimum UL quality value. Then, the RNC 100 compares the DL CPICH Ec/No values for BS B 104 and BS C 106 included in the candidate group. As a result, since the DL CPICH Ec/No value of "−12" for BS B 104 is higher than the DL CPICH Ec/No value of "−14" for BS C 106, BS B 104 is determined to be the new serving BS of the UE 110.

Subsequently, in steps 310 and 312, the RNC 100 transmits a Radio Link Reconfiguration Prepare (RLRP) message to each of BS A 102 and BS C 106. Also, the RNC 100 receives a Radio Link Reconfiguration Ready (RLRR) message from each of BS A 102 and BS C 106, and then transmits a Radio Link Reconfiguration Commit (RLRC) message to each of BS A 102 and BS C 106 in steps 314 and 316. At the same time, in step 318, the RNC 100 transmits a Physical Channel Reconfiguration (PCR) message to the UE 110, and then receives a Physical Channel Reconfiguration Complete (PCRC) message from the UE 110.

After the serving BS changing procedure as described above is completed, BS A 102, BS B 104, BS C 106, and the UE 110 transmit DMR and MR messages periodically based on a predefined period, that is, every 1 second, to the RNC 100, so that the RNC acquires DL and UL quality values for the corresponding BSs. Therefore, the RNC 100 can determine whether to maintain or change the current serving BS, based on the acquired DL and UL quality values for the corresponding BSs.

Figure 4:
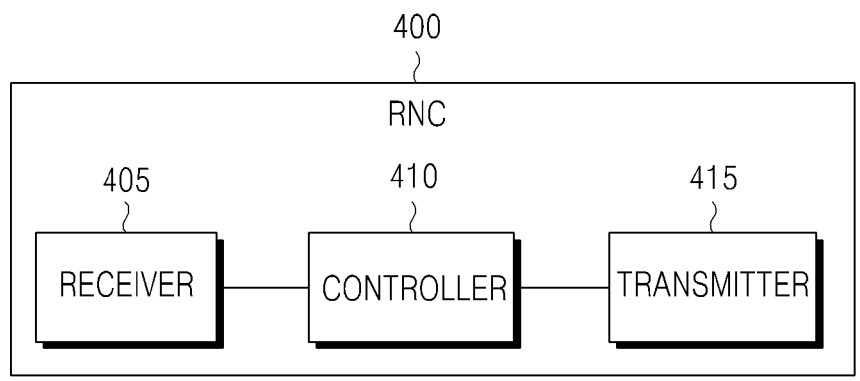
FIG. 4 is a block diagram illustrating a configuration of an RNC in accordance with an exemplary embodiment of the present invention.

FIG. 4 illustrates a configuration of an RNC according to an exemplary embodiment of the present invention.

Referring to FIG. 4, the RNC 400 includes a receiver 405, a controller 410, and a transmitter 415.

Under instructions of the controller 410, the transmitter 415 transmits a DMIR message instructing to each of the serving BS of a corresponding UE and BSs included in the active set of the UE to measure a UL quality value. The DMIR message includes a dedicated measurement type (for example, set to "SIR") and report characteristics including a periodic scheme and a period at which each BS measures and reports the UL quality value.

Under instructions of the controller 410, the transmitter 415 transmits a MC message that instructs the UE to measure each DL quality value for the BSs included in the its active set. The MC message includes an infra-frequency measurement quantity (for example, set to "CPICH Ec/No"), report criteria (for example, set to reporting at periodic time intervals), and a period at which the UE measures and reports each DL quality value.

The receiver 405 receives the UL quality values for the serving BS of the UE and the BSs included in the active set of the UE from each of the serving BS and the BSs included in the active set at the measurement period of the UL quality value, and receives each DL quality value for the serving BS and the BSs included in the active set from the UE at the measurement period of the DL quality value.

The controller 410 sets a minimum UL quality value that is determined through an actual test according to the environment of a corresponding mobile communication system, and determines if the UL quality value for the serving BS is less than the minimum UL quality value. When, as a result of the determination, the UL quality value for the serving BS is less than the minimum UL quality value, the controller selects BSs with UL quality values equal to or greater than the minimum UL quality value as serving BS candidates, from among the BSs included in the active set, and then determines a BS, which has the highest DL quality value among the serving BS candidates, to be the new serving BS of the UE.

According to the exemplary embodiments of the present invention as described above, a BS, which has the highest DL quality value among BSs with UL quality values equal to or greater than a minimum UL quality value, is determined to be the serving BS of a corresponding UE, so that shared resources allocated to each cell can be effectively assigned to UEs, and thus the corresponding UE can be provided with a stable data service.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. A method of changing a serving Base Station (BS) in a mobile communication system, the method comprising:
   receiving DownLink (DL) quality values for a current serving BS of a User Equipment (UE) and respective BSs included in an active set of the UE from the UE periodically based on a predefined period;
   determining if an UpLink (UL) quality value for the serving BS is less than a minimum UL quality threshold;
   when, as a result of the determination, the UL quality value for the serving BS is less than the minimum UL quality threshold, selecting BSs, which have UL quality values equal to or greater than the minimum UL quality threshold among the BSs included in the active set, as candidate BSs; and
   determining a new serving BS, which has a maximum DL quality value among the candidate BSs,
   wherein the minimum UL quality threshold is a minimum value at or above which the DL quality values for the serving BS and the BSs included in the active set can be received from the UE.

2. The method as claimed in claim 1, further comprising transmitting a message, which instructs each of the serving BS and the BSs included in the active set to measure the UL quality value thereof, to each of the serving BS and the BSs included in the active set, wherein the message includes a dedicated measurement type, which is set to a Signal-to-Interference Ratio (SIR), and report characteristics including a periodic scheme and a period of time corresponding to the period.

3. The method as claimed in claim 1, further comprising transmitting a Measurement Control (MC) message, which instructs the UE to measure the DL quality value for each of the BSs included in the active set, to the UE, wherein the MC message includes an infra-frequency measurement quantity, which is set to a common pilot channel energy of carrier/interference of others (CPICH Ec/No), a report criteria, which is set to periodic reporting, and a reporting interval, which is set to a period of time corresponding to the period.

4. The method as claimed in claim 1, wherein the minimum UL quality threshold is changed according to an environment of the corresponding mobile communication system.

5. An apparatus for changing a serving Base Station (BS) in a mobile communication system, the apparatus comprising:
   a controller for receiving DownLink (DL) quality values for a current serving Base Station (BS) of a User Equipment (UE) and respective BSs included in an active set of the UE from the UE periodically based on a predefined period, for determining if an UpLink (UL) quality value for the serving BS is less than a minimum UL quality threshold, for selecting BSs, which have UL quality values equal to or greater than the minimum UL quality threshold among the BSs included in the active set, as candidate BSs when, as a result of the determination, the UL quality value for the serving BS is less than the minimum UL quality threshold, and for determining a new serving BS, which has a maximum DL quality value among the candidate BSs,
   wherein the minimum UL quality threshold is a minimum value at or above which the DL quality values for the serving BS and the BSs included in the active set can be received from the UE.

6. The apparatus as claimed in claim 5, wherein the controller transmits a message, which instructs each of the serving BS and the BSs included in the active set to measure the UL quality value thereof, to each of the serving BS and the BSs included in the active set, and
   wherein the message includes a dedicated measurement type, which is set to a Signal-to-Interference Ratio (SIR), and report characteristics including a periodic scheme and a period of time corresponding to the predefined period.

7. The apparatus as claimed in claim 5, wherein the controller transmits a Measurement Control (MC) message, which instructs the UE to measure the DL quality value for each of the BSs included in the active set, to the UE, and, wherein the MC message includes an infra-frequency measurement quantity, which is set to a common pilot channel energy of carrier/interference of others (CPICH Ec/No), a report criteria, which is set to periodic reporting, and a reporting interval, which is set to a period of time corresponding to the predefined period.

8. The apparatus as claimed in claim 5, wherein the minimum UL quality threshold is changed according to an environment of the corresponding mobile communication system.

* * * * *